(12) United States Patent
Singh Gaur et al.

(10) Patent No.: US 7,182,925 B2
(45) Date of Patent: Feb. 27, 2007

(54) TANTALUM CONCENTRATES DISSOLUTION AND PURIFICATION METHOD

(75) Inventors: Raj P. Singh Gaur, Athens, PA (US); Robert G. Mendenhall, Waverly, NY (US)

(73) Assignee: Osram Sylvania Inc., Danvers, MA (US)

( * ) Notice: Subject to any disclaimer, the term of this patent is extended or adjusted under 35 U.S.C. 154(b) by 268 days.

(21) Appl. No.: 10/709,219

(22) Filed: Apr. 22, 2004

(65) Prior Publication Data

US 2004/0213716 A1    Oct. 28, 2004

Related U.S. Application Data

(60) Provisional application No. 60/320,140, filed on Apr. 24, 2003.

(51) Int. Cl.
*C01G 35/00* (2006.01)
*B01D 11/00* (2006.01)

(52) U.S. Cl. .............................. 423/63; 423/62; 423/67; 423/68

(58) Field of Classification Search .................. 423/63, 423/62, 67, 68
See application file for complete search history.

(56) References Cited

U.S. PATENT DOCUMENTS

| | | | | |
|---|---|---|---|---|
| 2,880,060 | A | * | 3/1959 | Campbell et al. ............. 423/65 |
| 3,117,833 | A | | 1/1964 | Pierret ........................... 23/19 |
| 3,712,939 | A | | 1/1973 | Capps et al. ................... 423/63 |
| 4,446,115 | A | | 5/1984 | Endo et al. .................... 423/63 |
| 4,673,554 | A | | 6/1987 | Niwa et al. .................... 423/63 |
| 4,923,507 | A | * | 5/1990 | Silva, Filho .................. 423/68 |
| 5,635,146 | A | | 6/1997 | Singh et al. ................... 423/65 |
| 6,010,676 | A | | 1/2000 | Singh et al. ................. 423/464 |
| 6,383,459 | B1 | | 5/2002 | Singh et al. ................... 423/68 |

* cited by examiner

*Primary Examiner*—Wayne A. Langel
*Assistant Examiner*—James Fiorito
(74) *Attorney, Agent, or Firm*—Robert F. Clark

(57) ABSTRACT

A method for the dissolution and purification of tantalum ore and synthetic concentrates is described. The method preferably uses ammonium bifluoride as the fluoride source in place of the hydrofluoric acid used in the conventional methods. Other fluoride compounds such as NaF, KF, and $CaF_2$ may be used alone or in combination with ammonium bifluoride. The tantalum concentrate and fluoride source are combined with sulfuric acid to form a solution containing tantalum values and impurities. The tantalum values are then separated from the impurities by solvent extraction.

12 Claims, No Drawings

TANTALUM CONCENTRATES DISSOLUTION AND PURIFICATION METHOD

CROSS REFERENCE TO RELATED APPLICATIONS

This application claims the benefit of U.S. Provisional Application No. 60/320,140, filed Apr. 24, 2003.

BACKGROUND OF INVENTION

High purity tantalum metal and tantalum pentoxide have become increasingly important to the electronics industry in the preparation of advanced electronic materials used in the manufacture of devices such as surface acoustic wave filters, pyroelectric infrared sensors, optoelectronic devices and capacitors.

Prior to 1957, niobium and transition metals were separated from tantalum by a fractional crystallization process known as the Marignac process which exploits the difference in solubility between $K_2TaF_7$ and $K_2NbOF_5 \cdot H_2O$ and other fluorometallates. However, tantalum pentoxide obtained by this process contains high levels of impurities such as Nb (1000–3000 ppm), Si (up to 3000 ppm), Ti (up to 100 ppm), and Fe (up to 2000 ppm). These exceed the total allowable transition metal impurity level (less than 1000 ppm) in the tantalum wire used in the manufacture of capacitors.

In the late 1950"s, modern solvent extraction and ion exchange processes supplanted the use of the Marignac process. Examples of liquid-liquid solvent extraction and ion exchange methods are disclosed in U.S. Pat. Nos. 3,117,833, 3,712,939, 4,673,554 and 4,446,115. In a solvent extraction process, ore concentrates containing at least 25 wt. % tantalum and niobium pentoxide are decomposed chemically in hydrofluoric acid media and the dissolved tantalum and niobium species are separated from the residue by filtration. The filtrate containing tantalum (as $TaF_7^{2-}$) and niobium (as $NbOF_5^{2-}$) in an $HF/H_2SO_4$ medium is brought into contact with an organic phase, usually methyl iso-butyl ketone (MIBK), which selectively absorbs tantalum and niobium species leaving impurities such as titanium, iron, and silicon in the aqueous phase. Niobium is separated from tantalum by back extraction with sulfuric acid. Finally, tantalum ($TaF_7^{2-}$) is eluted from the organic phase (MIBK) by an ammonium fluoride solution and converted into $K_2TaF_7$ by precipitation with KCl. Although $Ta_2O_5$ (or $K_2TaF_7$) made by the solvent extraction method can be used for most applications, this procedure is costly and uses large quantities of HF which requires special handling.

SUMMARY OF INVENTION

It is an object of this invention to obviate the disadvantages of the prior art.

It is another object of the invention to provide an economical method for dissolving and purifying tantalum concentrates without using hydrofluoric acid.

In accordance with the objects of this invention, there is provided a method for the dissolution and purification of tantalum concentrates, comprising: (a) combining a tantalum concentrate, a fluoride-containing compound, and sulfuric acid to form a solution containing tantalum values and impurities; the fluoride-containing compound being selected from $NH_4HF_2$, NaF, KF, $CaF_2$, or a combination thereof; and (b) separating the tantalum values from the impurities by solvent extraction.

DETAILED DESCRIPTION

We have discovered that tantalum concentrates such as tantalum ore concentrates and tantalum synthetic concentrates can be used to produce good purity tantalum compounds such as $K_2TaF_7$ and $Ta_2O_5$ by a method which does not use hydrofluoric acid (HF). The method of this invention preferably uses ammonium bifluoride, $NH_4HF_2$, as the fluoride source in place of the hydrofluoric acid used in the conventional methods. This is particularly advantageous because ammonium bifluoride is about 70% less expensive (in terms of F values) and much safer and easier to handle and store than hydrofluoric acid.

The method is similar to the one described in commonly owned U.S. Pat. No. 6,383,459 in which technical grade hydrated ammonium tantalum oxide, tantalum hydroxide and tantalum oxide is purified by a method which uses a fluoride-containing compound selected from ammonium bifluoride, NaF, KF, or $CaF_2$. However, tantalum concentrates are more difficult to process because they contain mixed mineral phases and much greater levels of contaminants. As used herein, the term tantalum concentrates includes both ore concentrates and synthetic concentrates. Typical tantalum ore concentrates may include tantalite (Fe, Mn)(Ta, Nb)$_2O_6$, niobite (columbite) (Fe, Mn, Mg)(Nb, Ta)$_2O_6$, pyrochlore/microlite (Ca, Na)$_2Ta_2O_6$(O, OH, F), loparite, and tin slags. Synthetic concentrates are typically generated from tungsten carbide scrap which contains from 1–3% Ta by weight. After tungsten and cobalt values are recovered from WC scrap, a sludge containing tantalum, niobium, and titanium is left behind. Table 1 provides some typical compositions of tantalum synthetic concentrates and tantalum ore concentrates. The main difference in the ore and synthetic concentrates seems to be in the Nb contents. Most tantalum-containing ores tend to also contain a high concentration of niobium. On the other hand, synthetic concentrates contain higher concentrations of Ti and Fe. The tantalum mineral closest in composition to a synthetic concentrate is tantalite which has a much higher tantalum content than niobium content. X-ray diffraction (XRD) analysis of synthetic concentrates indicates that the major crystalline phase is a pyrochlore cubic phase similar to sodium tantalate ($NaTaO_3$). In this case, the sodium tantalate detected by XRD is not a pure phase and, in fact, is a solid which may be represented by the general formula, (Na, Co, Ni, Ca, Fe, Al)$_2$(Ti, Nb, Ta)$_2O_6$. This compound can be considered similar to the mineral loparite or pyrochlore, containing Ti and Nb at Ta positions and bivalent and trivalent metals such as Co, Ni, Mn, Cr, Al, Ca and Fe at Na positions. The synthetic concentrates also contain a minor phase which may be represented as (Na, K)$_8$(Ta, Nb)$_6O_{19} \cdot nH_2O$.

TABLE 1

Compositions of Tantalum Synthetic and Ore Concentrates

| | Oxide Content (in weight percent) | | | | | |
|---|---|---|---|---|---|---|
| Oxide | Synthetic Concentrates | Tantalite | Niobite | Pyrochlore/ Microlite | Loparite | Tin slags |
| $Ta_2O_5$ | 30 | 53–60 | 12–18 | 0–70 | 8–10 | 9 |
| $Nb_2O_5$ | 7 | 12–30 | 50–58 | 0–63 | 8–10 | 10 |
| $TiO_2$ | 31 | 0.3–6 | 7–12 | 2–4 | 39–40 | 3 |
| $ThO_2$ | — | — | — | 0–5 | 0.2–1 | — |
| $UO_2$ | — | — | — | 0–11 | — | — |
| $UO_3$ | — | — | — | 0–16 | — | — |
| $Na_2O$ | 15 | — | — | 1–6 | 8–9 | — |

TABLE 1-continued

Compositions of Tantalum Synthetic and Ore Concentrates

Oxide Content (in weight percent)

| Oxide | Synthetic Concentrates | Tantalite | Niobite | Pyrochlore/ Microlite | Loparite | Tin slags |
|---|---|---|---|---|---|---|
| $K_2O$ | — | — | — | 0–1 | 0.2–1 | — |
| CaO | <1 | — | — | 4–18 | 4–5 | 15 |
| SrO | — | — | — | — | 2–4 | — |
| MnO | <1 | 3–17 | 2.5–8 | 0–8 | — | 3 |
| CoO | 5 | — | — | — | — | — |
| $Fe_2O_3$ | 1 | 2–16 | 11–19 | 0–10 | — | 11 |
| $Ln_2O_3$ | — | — | — | 2–13 | 32–34 | — |
| $Y_2O_3$ | — | — | — | 0–5 | — | — |
| $SnO_2$ | — | 0.1–1- | 0.1–3 | 0–4 | — | 2 |
| $ZrO_2$ | — | — | — | 0–6 | — | — |
| $WO_3$ | 6 | — | — | 0–<1 | — | — |
| $H_2O$ | — | — | — | 0–6 | — | — |

Generally, the method of this invention comprises dissolving tantalum concentrate and a fluoride-containing compound in sulfuric acid. Although the preferred fluoridecontaining compound is ammonium bifluoride, other fluoride-containing compounds including NaF, KF and $CaF_2$, or combinations thereof may be used separately or in combination with ammonium bifluoride. Once in solution, tantalum values are separated by a conventional solvent extraction method to produce highly pure $K_2TaF_7$ and $Ta_2O_5$.

EXAMPLE 1

In a four liter nalgene beaker, 260 g of a synthetic tantalum concentrate containing 13.9% Ta, 13.7% Ti, 10.4% W, 2.3% Nb, 2.3% Co, 1.1% Fe, 0.9% Cr, and 0.5% Ni (by weight) were slurried in 250 ml $H_2SO_4$ using a mixer. After the concentrate was well mixed with the sulfuric acid, 425 g of ammonium bifluoride crystals were added slowly while mixing continuously. An exothermic reaction was observed. Once the reaction was completed, 3 liters of water were added while mixing. After mixing for another fifteen minutes, the solids were separated by filtration, dried at 110° C., weighed accurately and analyzed quantitatively by x-ray fluorescence spectrometry. The results of the analysis indicated a >90% dissolution of tantalum from the synthetic concentrate.

EXAMPLE 2

In a four liter nalgene beaker, 260 g of a second synthetic tantalum concentrate containing 21.3% Ta, 20.0% Ti, 10.0% W, 4.7% Nb, 1.6% Co, 2.5% Fe, 1.9% Mn, and 0.1% Ni (by weight) were slurried in 250 ml $H_2SO_4$ using a mixer. After the concentrate was well mixed with the sulfuric acid, 425 g of ammonium bifluoride crystals were added slowly while mixing continuously. An exothermic reaction was observed. Once the reaction was completed, 2 liters of water were mixed with the slurry. After an additional 15 minutes of mixing, the supernate was removed by decantation. The solids were dried at 110° C., weighed accurately and analyzed quantitatively by x-ray fluorescence spectrometry. The results, reported in Table 2, indicated a 97% dissolution of tantalum from the tantalum concentrate.

TABLE 2

| Parameters | Ta-Concentrate | Solids After Dissolution of Ta |
|---|---|---|
| Weight | 260 g | 41.9 g |
| Co | 1.6% | 0.7% |
| Cr | <0.1% | 0.5% |
| Cu | <0.2% | <0.2% |
| Fe | 2.5% | 1.3% |
| Mn | 1.9% | <0.2% |
| Mo | <0.2 | 0.4% |
| Nb | 4.7% | 0.6% |
| Ni | 0.1% | 0.3% |
| Ta | 21.3% | 4.5% |
| Ti | 20.0% | 30.8% |
| W | 10.0% | 29.5% |

EXAMPLE 3

The tantalum-containing supernatant solution obtained from Example 2 contained: 2.2 g/l Fe, 4.9 g/l Nb, 21.0 g/l Ta, 20 g/l Ti and 1.7 g/l Co. The tantalum values were then removed by solvent extraction using methyl isobutyl ketone (MIBK). A 75 ml aliquot of the Ta-containing solution was contacted for 5 min with 50 ml MIBK. The raffinate was drained off after phase separation and was analyzed for Fe, Nb, Ta, Ti and Co. The results indicate that Ta had been selectively extracted by the MIBK (Table 3).

TABLE 3

Analytical data of Ta-solutions before and after solvent extraction

| Elements | Conc (g/l) Before Extraction | Conc. (g/l) After Extraction |
|---|---|---|
| Fe | 2.2 | 2.2 |
| Nb | 4.9 | 4.9 |
| Ta | 21.0 | 8.6 |
| Ti | 20.0 | 21.0 |
| Co | 1.7 | 1.8 |

The organic phase containing the tantalum values was washed once with 2 M $H_2SO_4$. After draining off the wash solution, the Ta values were stripped from the organic phase using 50 ml of water. The tantalum values were then precipitated from the stripping solution by adding ammonium hydroxide. The white precipitate was separated by filtration, washed once with 50 ml water and dried at 110° C. The dried precipitate was weighed, powdered and analyzed. The crystalline tantalum oxide thus obtained had very good purity as shown in Table 4.

TABLE 4

| Element | Concentrations with respect to $Ta_2O_5$, ppm |
|---|---|
| Ca | 0.5–5 |
| As | <500 |
| Nb | <500 |
| Ba | <5 |
| Be | <1 |
| Bi | <5 |
| Al | 1–10 |
| Ag | <0.5 |
| Co | <1 |
| Cr | <5 |
| Cu | <0.5 |
| Fe | <1 |
| Ge | <0.5 |
| Mg | <0.5 |

TABLE 4-continued

| Element | Concentrations with respect to $Ta_2O_5$, ppm |
|---|---|
| Mn | <1 |
| B | <1 |
| Cd | <5 |
| Ni | <1 |
| P | <500 |
| Pb | <5 |
| Sb | <5 |
| Si | 10–100 |
| Sn | <10 |
| Sr | <5 |
| Th | <500 |
| Ti | <5 |
| V | <5 |
| W | <500 |
| Zn | <10 |
| Zr | <10 |
| Mo | <5 |

These examples demonstrate that the dissolution of Ta concentrates in ammonium bifluride and $H_2SO_4$ is suitable for solvent extraction processing of Ta values. In addition, the results also indicate that the Ta extraction was specifically selective, i.e., Ta was the only extractable species (Table 3), making it possible to obtain a tantalum compound having a very good purity.

The invention claimed is:

1. A method for the dissolution and purification of tantalum concentrates, comprising: (a) forming a slurry of a tantalum concentrate containing at least one member selected from the group consisting of $(Fe,Mn)(Ta,Nb)_2O_6$, $(Fe,Mn,Mg)(Nb,Ta)_2O_6(CA,An)_2Ta_2O_6(O,OH,F)$ and $NaTaO_3$, a fluoride-containing compound, and sulfuric acid to cause an exothermic reaction, the fluoride-containing compound being selected from the group consisting of $NH_4HF_2$, NaF, KF, $CaF_2$, and combinations thereof; (b) separating liquid from the slurry to obtain a solution containing tantalum values and impurities; and (c) separating the tantalum values from the impurities by solvent extraction.

2. The method of claim 1 wherein the fluoride-containing compound is ammonium bifluoride.

3. The method of claim 1 wherein the solvent extraction comprises contacting the solution containing the tantalum values and impurities with an organic phase whereby at least a portion of the tantalum values in the solution are extracted into the organic phase, separating the organic phase from the solution, and contacting the organic phase with an aqueous medium to extract at least a portion of the tantalum values from the organic phase into the aqueous medium.

4. The method of claim 3 wherein the organic phase is methyl iso-butyl ketone.

5. The method of claim 4 wherein the fluoride-containing compound is ammonium bifluoride.

6. The method of claim 3 wherein the tantalum values are precipitated from the aqueous medium by adding ammonium hydroxide.

7. The method of claim 5 wherein the tantalum values are precipitated from the aqueous medium by adding ammonium hydroxide.

8. The method of claim 1 wherein greater than 90% of the tantalum values in the tantalum concentrate are dissolved into the solution.

9. The method of claim 2 wherein greater than 90% of the tantalum values in the tantalum concentrate are dissolved into the solution.

10. A method for the dissolution and purification of tantalum concentrates, comprising: (a) forming a slurry of a tantalum concentrate containing at least one member selected from the group consisting of $(Fe,Mn)(Ta,Nb)_2O_6$, $(Fe,Mn,Mg)(Nb,Ta)_2O_6$, $(CA,Na)_2Ta_2O_6(O,OH,F)$ and $NaTaO_3$, a fluoride-containing compound, and sulfuric acid to cause an exothermic reaction, the fluoride-containing compound being selected from the group consisting of $NH_4HF_2$, NaF, KF, $CaF_2$, and combinations thereof; (b) adding water to the slurry and extracting liquid from the slurry to obtain a solution containing tantalum values and impurities; (c) contacting the solution with an organic phase comprising methyl iso-butyl ketone whereby at least a portion of the tantalum values in the solution are extracted into the organic phase, (d) separating the organic phase from the solution, (e) contacting the organic phase with water whereby at least a portion of the tantalum values in the organic phase are extracted into an aqueous medium, and (f) precipitating a tantalum compound from the aqueous medium.

11. The method of claim 10 wherein the fluoride-containing compound is ammonium bifluoride.

12. The method of claim 11 wherein greater than 90% of the tantalum values in the tantalum concentrate are dissolved into the solution.

* * * * *